SUPERREGENERATIVE RADIO RECEIVER

Filed Oct. 11, 1945 2 Sheets-Sheet 1

Inventor
JOHN F. CLARK JR.

By Ralph L. Chappell
Attorney

Inventor

JOHN F. CLARK JR.

By Ralph L Chappell

Attorney

United States Patent Office 2,804,545

Patented Aug. 27, 1957

2,804,545

SUPERREGENERATIVE RADIO RECEIVER

John F. Clark, Jr., United States Navy

Application October 11, 1945, Serial No. 621,655

10 Claims. (Cl. 250—20)

(Granted under Title 35, U. S. Code (1952), sec. 266)

This invention relates to receivers of high frequency electromagnetic energy waves, and more particularly to such receivers employing a velocity modulated tube.

Receivers designed for frequencies too high for ordinary triodes commonly are either of the superheterodyne type in which a velocity modulated tube is employed as a local oscillator with a crystal used for a mixer, or of the crystal video type in which the output of a crystal rectifier is amplified by a video amplifier. The first type receiver provides high sensitivity and high selectivity, but requires several intermediate stages of aplification in addition to the oscillator, mixer, and second detector stages. The second type is considerably simpler in construction but does not provide as high sensitivity or selectivity as the superheterodyne receiver. The danger of burning out the crystal mixer or rectifier by an unusually large burst of R. F. energy is another disadvantage of both types of receivers.

Accordingly, it is an object of this invention to provide a radio receiver employing a velocity modulated tube which has high sensitivity and high selectivity.

It is another object of this invention to provide such a receiver which is simple in design and small in size.

It is another object of this invention to provide such a receiver which is not subject to crystal burnout due to an overload.

It is another object of this invention to provide such a receiver having a band width easily adjustable, as desired, over a wide range.

These objects are achieved in this invention by applying the principle of superregenerative detection in a novel manner to a velocity modulted tube. This results in a highly sensitive and highly selective detector stage which at the same time provides in the same stage an output signal of an amplitude which could be achieved only by several stages of amplification in the ordinary superheterodyne receiver.

This invention will be more clearly understood by reference to the following detailed description and the accompanying drawings, in which—

Figure 1:
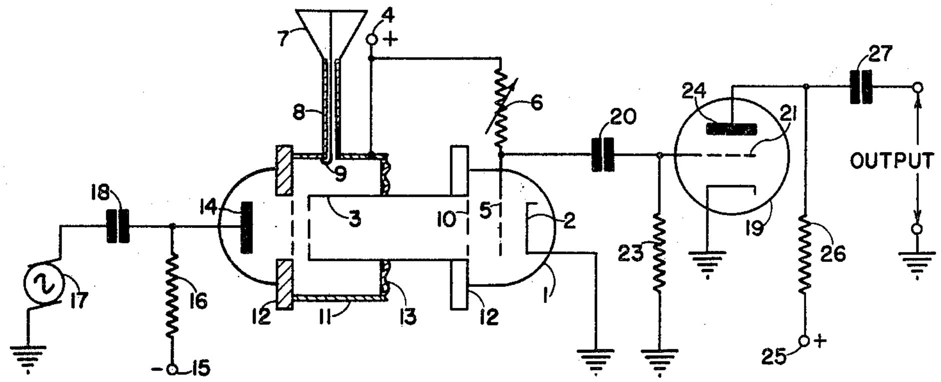
Figure 1 is a digrammatic representation of one embodiment of this invention.

In the embodiment of Figure 1 a velocity modulated tube 1 has its cathode 2 grounded and its anode 3 returned to a source of positive potential 4. Accelerating grid 5 is returned to the same source of positive potential through a variable impedance 6, shown in Figure 1 as a variable resistor. When the resistance of resistor 6 is increased, the voltage generated by the grid current flowing through resistor 6 increases, causing the grid voltage to decrease, the beam current to decrease, and thus the Q of cavity resonator 11 to increase.

The incoming electromagnetic energy wave is received by antenna 7 and transmitted via concentric cable 8 to loop 9, which provides coupling with cavity resonator 11. The coupling between cable 8 and resonator 11 of course might also be of an electrostatic nature, employing a voltage probe.

In the embodiment of Figure 1, cavity resonator 11 is tuned by varying the spacing between tuning rings 12 and thus exerting pressure on flexible diaphragm 13. Resonator 11 might also be an external cavity tuned by varying in some manner its mechanical dimensions or its shunt capacity.

As shown, tube 1 is a single resonator or reflex type velocity modulated tube. In this type tube, oscillation is caused by applying to repellor 14 a negative potential of a value which will cause the electron beam to be reflected back towards resonator 11 with the electrons bunched to produce feedback of the proper phase to sustain oscillations at the frequency to which the cavity resonator is tuned.

Figure 2:
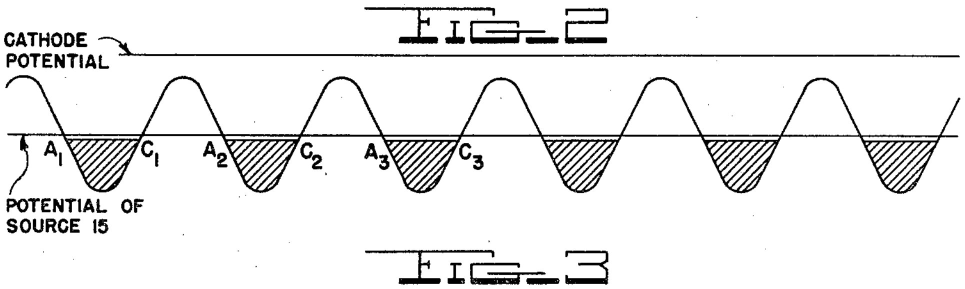
Figures 2 through 6 are diagrams of various voltages and currents which are present during the operation of this invention.

In this invention repellor 14 is connected to a source of fixed negative potential 15 through resistor 16. This negative potential alone may or may not be of the proper value to sustain oscillations in the tube. In any event, alternating voltage source 17 provides an alternating voltage which when applied to repellor 14 through capacitor 18 makes the repellor voltage the proper value to sustain oscillations during a fraction of each cycle of source 17, and not to sustain oscillations during the remainder of each cycle. Figure 2 illustrates the wave form of the voltage on repellor 14. The shaded portions exemplify the fractions of each cycle during which oscillations are possible in the tube.

When there is no R. F. signal being fed to resonator 11 by loop 9, oscillations will nevertheless be initiated in tube 1 by random electrical noise as soon as the repellor voltage becomes of the proper value to sustain oscillations. This is indicated as point $A_1$ in the first cycle in Figure 2.

Figure 3:
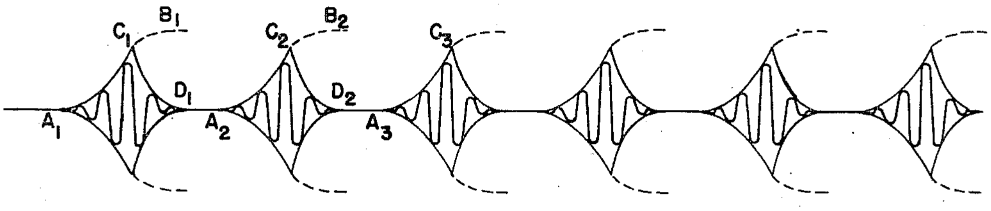

The waveform of the R. F. voltage present in the cavity resonator when no R. F. signal is externally applied is illustrated by Figure 3. As shown, oscillations begin to build up gradually at point $A_1$ and increase in amplitude until either the oscillations reach their maximum possible amplitude for that particular circuit, as at point $B_1$, or the repellor voltage no longer will sustain oscillations, as at point $C_1$. When the repellor voltage is no longer of the proper value to sustain oscillations, the R. F. voltage in cavity resonator 11 begins to be damped out, falling off exponentially to practically zero amplitude at point $D_1$.

In Figure 3 for clarity the period of the R. F. voltage is greatly exaggerated compared to the period of the repellor voltage shown in Figure 2. In an actual embodiment of this invention the frequency of the alternating voltage from voltage source 17 was 2 mc./s., while the frequency to which resonator 11 was tuned was 3000 mc./s.

When there is an R. F. signal being fed to resonator 11 by loop 9, such as the modulated R. F. signal shown in Figure 4, oscillations will be initiated in tube 1 by this signal voltage as soon as the repellor voltage becomes of the proper value to sustain oscillations.

Figure 4:
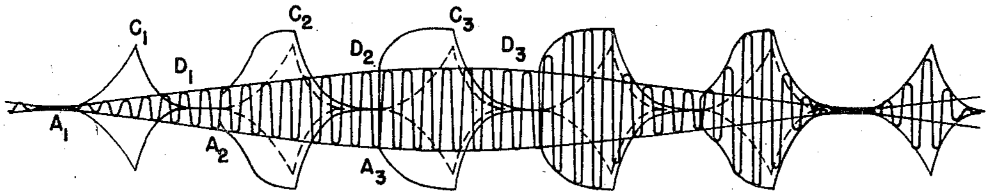

The waveform of the R. F. voltage present in the cavity resonator under these conditions is illustrated in Figure 4. As shown, the build-up time required for the R. F. oscillations to reach their maximum amplitude is reduced because the initiating pulse is provided by an R. F. signal which, although small, is nevertheless of larger amplitude than the random noise which initiated the oscillations shown in Figure 3.

In Figure 4 the amplitude of the modulated R. F. signal fed into resonator 11 by loop 9 is greatly exaggerated so as to make more evident the different amplitudes which the R. F. signal, acting as an oscillation initiating impulse, has at points $A_1$, $A_2$, $A_3$, etc. Also, for clarity, only the envelope of the R. F. oscillations is shown for the first three R. F. pulses in Figure 4, while only the envelope of the received modulated R. F. signal is shown for most of the remainder of the figure. Finally, the frequency of the repellor voltage as compared to the frequency of the modulation envelope of the R. F. signal will usually be very much greater than is shown in Figure 4. In the actual embodiment of this invention mentioned above, for example, the frequency of 2 mc./s. would be several hundred or several thousand times the modulating frequency if the latter was in the audio frequency range.

From Figure 4 it will be seen that when an R. F. signal is fed into resonator 11, the average maximum amplitude of the alternating voltage in resonator 11 between points such as $A_2$ and $A_3$ will be greater than when no R. F. signal was present to initiate oscillations. This will be seen by a comparison of the envelopes of the R. F. pulses shown in Figure 4 as initiated by the R. F. signal on loop 9, and the envelopes drawn in dotted lines in Figure 4 similar to the envelopes of the oscillations shown in Figure 3 which were initiated by random electrical noise.

Moreover, it will be seen that the size of this increase in the average maximum amplitude of the R. F. voltage between points $A_2$ and $A_3$ in Figure 4 will depend upon the amplitude of the received R. F. signal present on loop 9 when the repellor voltage reached point $A_2$. In short, the average rectified R. F. voltage available from resonator 11 during any period of time such as $A_1A_2$, $A_2A_3$, $A_3A_4$, etc., will depend upon the signal fed into the cavity by loop 9 at points $A_1$, $A_2$, $A_3$, etc., respectively.

Thus, if the R. F. oscillations in resonator 11, produced as described above in the presence of a received signal on loop 9, are (1) rectified, (2) applied to some means which filters out the R. F. voltage, and (3) then applied to a means responsive only to the variation in average rectified voltage from one short period of time such as $A_1A_2$ to the next such period, this will reproduce the modulation envelope of the received signal.

This invention makes use of the discovery that the accelerating grid of certain velocity modulated tubes will accomplish the first two of these steps, operating simultaneously as a means to rectify the R. F. oscillations in the tube and as a means to filter out the R. F. voltage. Therefore, when the output voltage taken off this accelerating grid is applied to a means which responds only to variations in the average rectified voltage from one short period of time such as $A_1A_2$ to the next, the modulation envelope of the received R. F. signal will be reproduced, as stated above.

The described action of the accelerating grid of these velocity modulated tubes is brought about by the fact that when such tubes go into oscillation the direct current through grid 5 decreases, from the value it has when there is no R. F. voltage in resonator 11, by an amount proportional to the maximum amplitude of successive cycles of the R. F. oscillations in cavity resonator 11.

Figure 5:
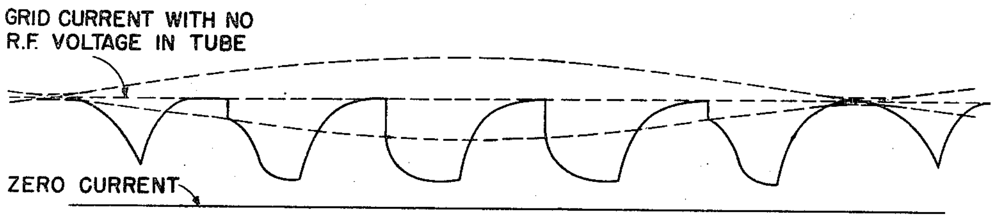

Thus, Figure 5 illustrates the waveform of the direct current pulses which flow at accelerating grid 5 when the R. F. voltage having the waveform shown in Figure 4 is present in cavity resonator 11. The modulation envelope of the received R. F. signal shown in Figure 4 is indicated in Figure 5 in dotted lines. It will be seen that the current through grid 5 decreases whenever an R. F. pulse is present in resonator 11 by an amount proportional to the maximum amplitude of the corresponding cycle of the R. F. oscillations.

Figure 6:
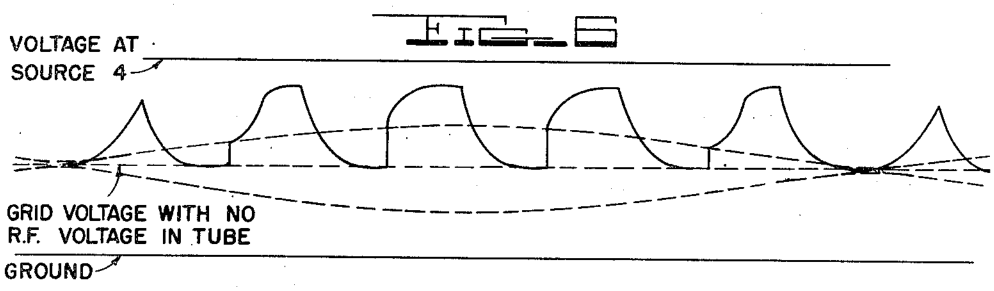

When the current through resistor 6 is reduced, the voltage on accelerating grid 5 is increased. Therefore, the negative current pulses through accelerating grid 5 which are shown in Figure 5 produce positive voltage pulses on that grid, as shown in Figure 6. As will be seen, the average amplitude of these voltage pulses follows the modulation envelope of the received signal, which is shown in dotted lines.

The third step listed above for the detection of the modulation envelope of the received signal may be effected by a means operative to filter out that component of the voltage of Figure 6 having the same frequency as the repellor voltage, and operative to pass the integrated modulation envelope of the voltage of Figure 6.

In the embodiment of Figure 1 this means is shown as an amplifier 19 which has parameters such that only the modulation frequencies of the received R. F. signal are amplified. The output voltage from grid 5 of tube 1 is coupled to amplifier 19 by coupling capacitor 20, which of course passes only the alternating component of the voltage of Figure 6. This is applied to grid 21 of amplifier 19 across resistor 23. The modulation envelope of the signal received by antenna 7 is reproduced on plate 24, which is returned to a source of positive potential 25 through resistor 26. The output signal is passed on through coupling capacitor 27.

Figures 7, 8, 9:
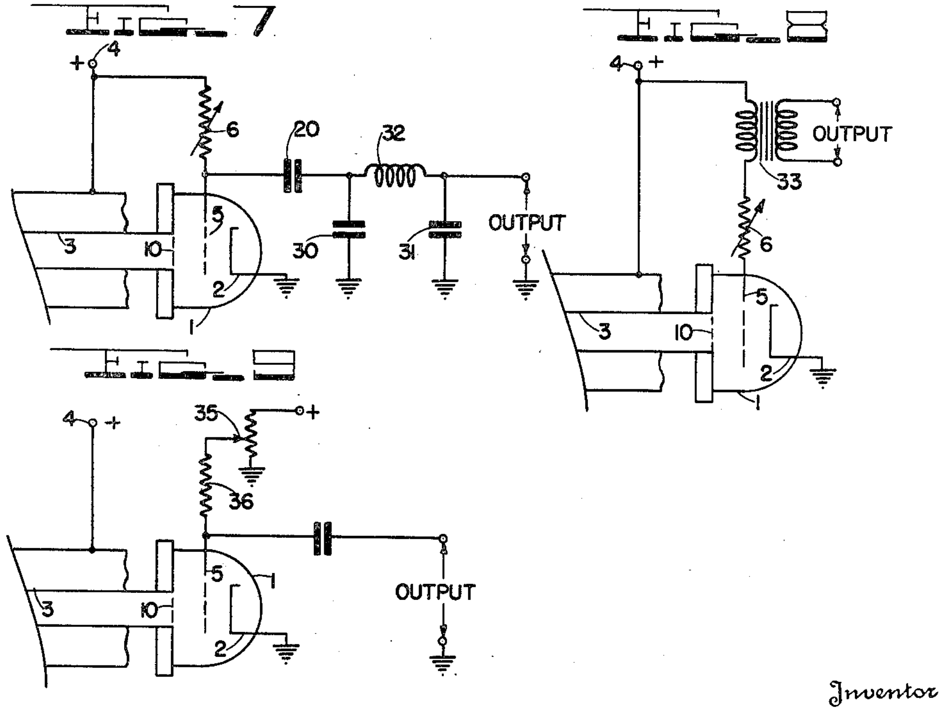
Figures 7 through 9 are diagrammatic representations of three modifications of a portion of Figure 1.

In place of amplifier 19 any other suitable means of detecting the integrated modulation envelope of the voltage pulses of Figure 6 may be employed. For example, in Figure 7 is shown a low-pass filter, composed of capacitors 30 and 31 and inductor 32, having a cut-off frequency above the modulation frequencies of the received signal and below the frequency of the repellor voltage. Also, an audio transformer 33 could be employed in the grid circuit in series with impedance 6, as shown in Figure 8.

It will be understood that this inventon may also be employed to receive pulsed R. F. signals, if the time duration of the pulses to be received is of about the same magnitude as the period of the repellor voltage or larger.

For the embodiment of Figure 1, the signal applied to grid 21 of tube 19 has been measured as being of the order of 0.1 volt for a received signal on antenna 7 of 100 microvolts at 3000 mc./s. Thus, in addition to detecting received signals, this invention produces in a single stage amplification of approximately 1000 times. This amplification, moreover, has been obtained for band widths, measured betwen half-voltage points, of as high as 50 mc./s.

The velocity modulated tubes which may be employed in this invention as described above are those in which the spacing and positioning of accelerating grid 5 and the smoother grid 10 of anode 3 are such that the current drawn by grid 5 decreases as described when the maximum amplitude of the R. F. oscillations in resonator 11 increases. It will be understood of course that this invention will operate as well with a velocity modulated tube whose accelerating grid current increases when the maximum amplitude of the R. F. oscillations in resonator 11 increases.

As explained above, a change in the voltage on accelerating grid 5 will change the Q of resonator 11. One means of varying this voltage is to vary the resistance of resistor 6. When variable resistance 6 is increased, for example, the voltage across it increases, causing the voltage on grid 5 to decrease. When this happens the beam current decreases, the Q of cavity resonator 11 increases, and the effective width of the frequency band between half-voltage points is decreased. Conversely, when variable resistance 6 is decreased, the voltage on grid 5 increases, the beam current increases, the Q of the resonator decreases, and the band width increases. Therefore, the selectivity of the receiver of Figure 1 may be increased or decreased, as desired, by adjustment of the resistance of variable resistor 6.

Figure 9 shows another means of varying the voltage on accelerating grid 5 in order to vary the selectivity of this receiver. In this embodiment a voltage from a variable voltage source 35 is applied to grid 5 through an impedance of constant value such as fixed resistor 36, It will be understood that the embodiment shown and described is exemplary only, and that the scope of the invention will be determined with reference to the appended claims.

The invention described herein may be manufactured and used by or for the Government of the United States of America for governmental purposes without payment of any royalties thereon or therefor.

What is claimed is:

1. A receiver of high frequency electromagnetic energy waves comprising antenna means, a velocity modulated tube including a source of electrons, cavity resonator means, repellor means, anode means, and accelerating grid means for receiving a portion of the electrons drawn from said source, means coupling the antenna means with the cavity resonator means, first power supply means generating a voltage fluctuating in amplitude, means applying said fluctuating voltage to the repellor means so that the tube will alternately go in and out of oscillation, second power supply means providing a fixed positive voltage, means applying said positive voltage to the anode means, impedance means, and means applying said positive voltage through the impedance means to said accelerating grid means, the current through said impedance means varying from its value for no alternating voltage in the cavity resonator means by an amount proportional to the maximum amplitude of successive cycles of an alternating voltage in the cavity resonator means, and current variation detecting means connected to said impedance means for detecting variations in said current through said impedance means.

2. A receiver of high frequency electromagnetic energy waves comprising antenna means, a velocity modulated tube including a source of electrons, cavity resonator means, repellor means, anode means, and accelerating grid means for receiving a portion of the electrons drawn from said source, means coupling the antenna means with the cavity resonator means, first power supply means generating a voltage fluctuating in amplitude, means applying said fluctuating voltage to the repellor means so that the tube will alternately go in and out of oscillation, second power supply means providing a fixed positive voltage, means applying said positive voltage to the anode means, resistance means, and means applying said positive voltage through the resistance means to said accelerating grid means, the current through said resistance means varying from its value for no alternating voltage in the cavity resonator means by an amount proportional to the maximum amplitude of successive cycles of an alternating voltage in the cavity resonator means, and current variation detecting means connected to said resistance means for detecting variations in said current through said resistance means.

3. A receiver of high frequency electromagnetic energy waves comprising antenna means, a velocity modulated tube including a source of electrons, cavity resonator means, repellor means, anode means, and accelerating grid means for receiving a portion of the electrons drawn from said source, means coupling the antenna means with the cavity resonator means, first power supply means generating a voltage fluctuating in amplitude, means applying said fluctuating voltage to the repellor means so that the tube will alternately go in and out of oscillation, second power supply means providing a fixed positive voltage, means applying said positive voltage to the anode means, impedance means, means applying said positive voltage through the impedance means to said accelerating grid means, the current through said impedance means varying from its value for no alternating voltage in the cavity resonator means by an amount proportional to the maximum amplitude of successive cycles of an alternating voltage in the cavity resonator means, integrating means responsive only to variations in average direct current voltage on the accelerating grid means measured from the beginning of one cycle of said fluctuating repellor voltage to the beginning of the next, and means coupling the accelerating grid means with said integrating means for detecting said current variations.

4. A receiver of high frequency electromagnetic energy waves comprising antenna means, a velocity modulated tube including a source of electrons, cavity resonator means, repellor means, anode means, and accelerating grid means for receiving a portion of the electrons drawn from said source, means coupling the antenna means with the cavity resonator means, first power supply means generating a voltage fluctuating in amplitude, means applying said fluctuating voltage to the repellor means so that the tube will alternately go in and out of oscillation, second power supply means providing a fixed positive voltage, means applying said positive voltage to the anode means, impedance means, means applying said positive voltage through the impedance means to said accelerating grid means, the current through said impedance means varying from its value for no alternating voltage in the cavity resonator means by an amount proportional to the maximum amplitude of successive cycles of an alternating voltage in the cavity resonator means, low-pass filter means operative to pass voltages having frequencies equal to the modulation frequencies of a signal received by said antenna and to reject voltages of the repellor voltage frequency, and means coupling the accelerating grid means with said low-pass filter means for detecting said current variations.

5. A receiver of high frequency electromagnetic energy waves comprising antenna means, a velocity modulated tube including a source of electrons, cavity resonator means, repellor means, anode means, and accelerating grid means for receiving a portion of the electrons drawn from said source, means coupling the antenna means with the cavity resonator means, first power supply means generating a voltage fluctuating in amplitude, means applying said fluctuating voltage to the repellor means so that the tube will alternately go in and out of oscillation, second power supply means providing a fixed positive voltage, means applying said positive voltage to the anode means, audio transformer means, and means applying said positive voltage through a winding of the audio transformer means to said accelerating grid means for detecting variations in the current to said accelerating grid means, the current through said audio transformer means varying from its value for no alternating voltage in the cavity resonator means by an amount proportional to the maximum amplitude of successive cycles of an alternating voltage in the cavity resonator means.

6. A receiver of high frequency electromagnetic energy waves comprising antenna means, a velocity modulated tube including a source of electrons, cavity resonator means, repellor means, anode means, and accelerating grid means for receiving a portion of the electrons drawn from said source, means coupling the antenna means with the cavity resonator means, first power supply means generating a voltage fluctuating in amplitude, means applying said fluctuating voltage to the repellor means so that the tube will alternately go in and out of oscillation, second power supply means providing a fixed positive voltage, means applying said fixed voltage to the anode means, third power supply means providing a variable positive voltage, impedance means, and means applying said variable voltage through the impedance means to said accelerating grid means, whereby the current through said impedance means varies from its value for no alternating voltage in the cavity resonator means by an amount proportional to the maximum amplitude of successive cycles of an alternating voltage in the cavity resonator means, and current variation detecting means connected to said impedance means for detecting variations in said current through said impedance means.

7. A receiver of high frequency electromagnetic energy waves comprising antenna means, a velocity modulated tube including a source of electrons, cavity resonator means, repellor means, anode means, and accelerating grid means for receiving a portion of the electrons drawn from said source, means coupling the antenna means with the cavity resonator means, first power supply means generating a voltage fluctuating in amplitude, means applying said fluctuating voltage to the repellor means so that the tube will alternately go in and out of oscillation, second power supply means providing a fixed positive voltage, means applying said positive voltage to the anode means, variable impedance means, and means applying said positive voltage through said impedance means to said accelerating grid means the current through said variable impedance means varying from its value for no alternating voltage in the cavity resonator means by an amount proportional to the maximum amplitude of successive cycles of an alternating voltage in the cavity resonator means, and current variation detecting means connected to said impedance means for detecting variations in said current through said impedance means.

8. A receiver of high frequency electromagnetic energy waves comprising antenna means, a velocity modulated tube including a source of electrons, cavity resonator means, repellor means, anode means, and accelerating grid means for receiving a portion of the electrons drawn from said source, means coupling the antenna means with the cavity resonator means, first power supply means generating a voltage fluctuating in amplitude, means applying said fluctuating voltage to the repellor means so that the tube will alternately go in and out of oscillation, second power supply means providing a fixed positive voltage, means applying said positive voltage to the anode means, impedance means, means applying said positive voltage through the impedance means to said accelerating grid means, whereby the current through said impedance means varies from its value for no alternating voltage in the cavity resonator means by an amount proportional to the maximum amplitude of successive cycles of an alternating voltage in the cavity resonator means, and means controlling the quality factor of said cavity resonator.

9. A receiver of high frequency electromagnetic energy waves comprising antenna means, a velocity modulated tube including a source of electrons, cavity resonator means, repellor means, anode means, and accelerating grid means for receiving a portion of the electrons drawn from said source, means coupling the antenna means with the cavity resonator means, first power supply means generating a voltage fluctuating in amplitude, means applying said fluctuating voltage to the repellor means so that the tube will alternately go in and out of oscillation, second power supply means providing a fixed positive voltage, means applying said positive voltage to the anode means, impedance means, means applying said positive voltage through the impedance means to said accelerating grid means, whereby the current through said impedance means varies from its value for no alternating voltage in the cavity resonator means by an amount proportional to the maximum amplitude of successive cycles of an alternating voltage in the cavity resonator means, and means controlling said positive voltage applied to said accelerating grid means for varying the quality factor of said cavity resonator means.

10. In a receiver of high frequency electromagnetic energy waves including antenna means, a velocity modulated tube including a source of electrons, cavity resonator means, repellor means, anode means, accelerating grid means, means coupling the antenna means with the cavity resonator means, first power supply means generating a voltage fluctuating in amplitude, means applying said fluctuating voltage to the repellor means so that the tube will alternately go in and out of oscillation, second power supply means providing a fixed positive voltage, means applying said fixed positive voltage to the anode means, and means connecting said positive voltage to said accelerating grid means; means for detecting the modulation envelope of a received signal comprising an impedance means in said connecting means to said accelerating grid; and current variation detecting means connected to said impedance means for detecting variations in the current through said impedance means.

References Cited in the file of this patent

UNITED STATES PATENTS

| | | |
|---|---|---|
| 2,190,511 | Cage | Feb. 13, 1940 |
| 2,190,515 | Hahn | Feb. 13, 1940 |
| 2,293,151 | Linder | Aug. 18, 1942 |
| 2,306,282 | Samuel | Dec. 22, 1942 |
| 2,379,673 | Banks | July 3, 1945 |
| 2,412,710 | Bradley | Dec. 7, 1946 |
| 2,427,382 | Boothroyd | Sept. 16, 1947 |
| 2,533,237 | Ferrill et al. | Dec. 12, 1950 |